No. 712,484. Patented Nov. 4, 1902.
W. P. BETTENDORF.
METAL WHEEL.
(Application filed Oct. 22, 1900. Renewed July 25, 1902.)
(No Model.)

Witnesses:
R. J. Jacker.
M. Friel.

Inventor:
William P. Bettendorf
By Frank D. Thomason
Atty

UNITED STATES PATENT OFFICE.

WILLIAM P. BETTENDORF, OF DAVENPORT, IOWA.

METAL WHEEL.

SPECIFICATION forming part of Letters Patent No. 712,484, dated November 4, 1902.

Application filed October 22, 1900. Renewed July 25, 1902. Serial No. 116,886. (No model.)

*To all whom it may concern:*

Be it known that I, WILLIAM P. BETTENDORF, a citizen of the United States, and a resident of Davenport, Scott county, Iowa, have invented certain new and useful Improvements in Metal Wheels, of which the following is a full, clear, and exact specification, reference being had to the accompanying drawings.

My invention relates to metal wheels having the inner ends of the spokes secured between the circumferential flanges of two corresponding plates forming the exterior of the hub. Securing the ends of spokes between plates in this manner has been done before; but such attempts have not been satisfactory, because the clamping action of the two plates was alone depended upon to secure the necessary rigidity of the structure. As the flanges of these plates were secured together by rivets located between the spoke-sockets, it will be readily seen that the vibration and strain on the spokes when the wheel is in use would spread the sockets and make the spokes loose and more liable to break.

The object of my invention is to prevent the spokes becoming loose and to rigidly secure the same in the sockets of the hub in the manner substantially as hereinafter fully described and as particularly pointed out in the claims.

Figure 1:
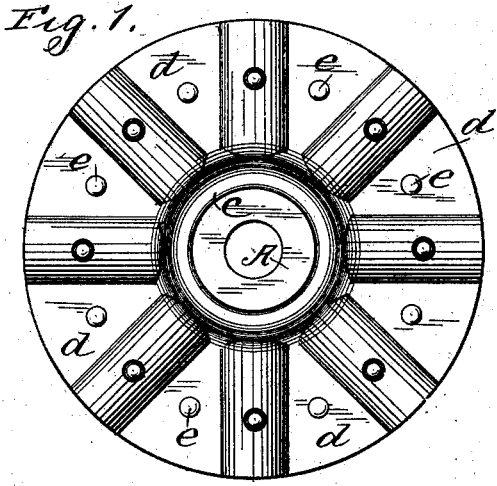
Figure 2:
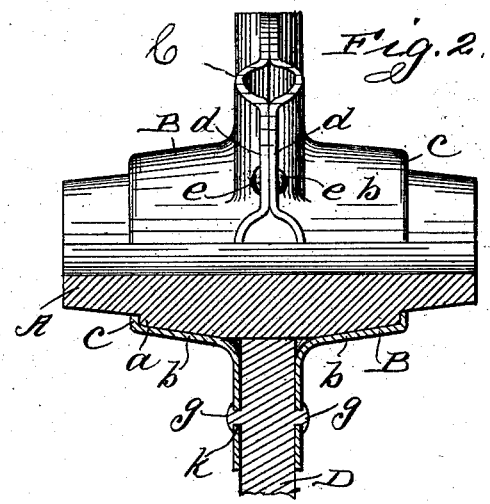
Figure 3:
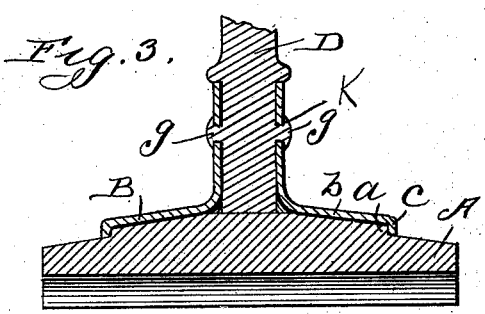
Figure 4:
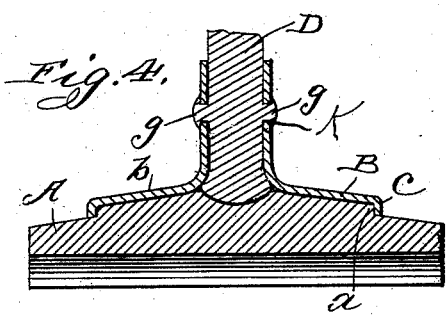
Figure 5:
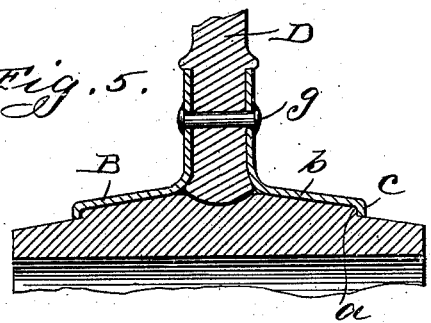
Figure 6:

In the drawings, Figure 1 is an end view of the hub of my improved wheel. Fig. 2 is a side view thereof, showing the lower half in longitudinal section and a spoke inserted in the socket. Fig. 3 is a longitudinal central section of one-half of the hub, having a modified construction of the spoke secured therein. Fig. 4 is a similar view showing another modified construction of the spoke inserted in the hub, and Fig. 5 is a similar view showing yet another modified construction of the spoke. Fig. 6 is a detail view showing a section through a portion of the united plates, showing modified means of securing said plates together at points between the sockets.

In the drawings, A represents a metal core for the hub, the body of which is barrel-shaped and the ends reduced to a less diameter, to produce the shoulders $a$ $a$, and tapered.

B B represent two corresponding circular plates, which are provided with central openings of about the same diameter as the base of shoulders $a$, and the central portion is swaged to form a cup-shaped hub-section $b$, the marginal portion $c$ of which surrounding the central opening being inturned, and the length of the same corresponding to the distance between shoulders $a$ and the center of length of the core A. The remaining portion of plates B flare outward to form circumferential flanges $d$, in the surfaces of which, opposite the side from which the hub sections project, are made a series of radial corrugations or grooves C C, the curvature and dimensions of which correspond to one-half the transverse contours of the inner end of the spoke D. When the plates B are placed on the core A so that the inturned marginal edges of the central opening thereof bear against shoulders $a$ and the flanges $d$ of the same come together at the center of length of the hub in proper position, said plates are riveted together by rivets $e$, extending through the same between the grooves C. The proper position for these plates to be in when thus secured together is such that the grooves C of both plates come in the same radial planes and form spoke-sockets.

The preceding description relates to an old form of metal wheel. My improvement consists in providing the hitherto plain or straight sides of the end of the spoke with two laterally-projecting integral studs $g$, located diametrically opposite each other, and in providing openings $k$ in the sides of the sockets in said plates, into and out through which said studs are extended when said plates are brought together and have their outer ends swaged to form heads to not only prevent the longitudinal withdrawal of the spoke, but to assist in clamping plates B together. If desired, rivets $e$, extended through the plates B between the sockets, may be entirely dispensed with and the heading of the studs $g$ be relied upon to secure said plates together, or if said rivets are used the swaging of the ends of studs or otherwise forming a head thereon may be omitted, as in this latter event they would effectually prevent the accidental withdrawal of the spoke. While I much prefer the use of two studs $g$, as hereinbefore described, yet it is obvious one only could be employed. Studs *g* are shown in the drawings and are hereinbefore described as being integral with the spoke. This is thought to be the best mode of construction, as the spoke is not thereby weakened. A pin or independent rivet of such length that its ends could project sufficiently beyond the sides of the spoke, however, could be used and made to answer the same purpose, substantially as shown in Fig. 5 of the drawings.

In Fig. 6 I show a modified means of securing the plates together at points between the sockets as a substitute for rivets *c*, consisting of forming one of said plates with a circular opening *m* and the other plate with an integral tubular offset or rivet *n*, which when the plates are brought together extend through opening *m* and have their edges *o* swaged or bent outward to lap over the margins of opening *n* and clamp the plates together.

What I claim as new is—

1. In a metal wheel, a hub having two annular metal plates the radially-disposed portions of which are clamped together and have sockets formed between their meeting faces, in combination with metal spokes the inner end portions of which between their inner extremities and the part thereof outside of said sockets, have lateral projections, which, when said plates are clamped together extend through the wall of the sockets.

2. In a metal wheel, a hub having two annular metal plates the radially-disposed portions of which are clamped together and have sockets formed between their meeting faces, in combination with metal spokes the inner end portions of which between their inner extremities and the part thereof outside of said sockets have lateral projections, which, when said plates are clamped together extend through the wall of the sockets, and are headed.

3. In a metal wheel, a hub having two annular metal plates the radially-disposed portions of which are clamped together and have sockets formed between their meeting faces, in combination with metal spokes the inner portions of which have oppositely-located lateral projections between their inner extremities and the part thereof outside said sockets, which when said plates are clamped together enter the walls of the socket in which they are seated.

4. In a metal wheel, a hub having two annular plates the radially-flanged portions of which are brought in contact and have sockets formed between the meeting faces thereof, and rivets extending through said flanges at points located between said sockets for clamping said plates together, in combination with metal spokes the inner end portions of which between their inner extremities and the part outside of said sockets are provided with projections which extend into suitable seats in the walls of said socket.

5. In a metal wheel, a hub having two annular plates the radially-flanged portions of which are brought in contact and have sockets with openings in their sides formed between the meeting faces thereof, and rivets extending through said flanges at points located between said sockets for clamping said plates together, in combination with metal spokes the inner end portions of which between their inner extremities and the part outside of said sockets are provided with projections which extend into and through the openings in the sides of said sockets.

6. In a metal wheel, a hub having two annular plates the radially-flanged portions of which are brought in contact and have sockets with openings in their sides formed between the meeting faces thereof, and rivets extending through said flanges at points located between said sockets for clamping said plates together, in combination with metal spokes the inner end portions of which between their inner extremities and the part outside of said sockets are provided with projections which extend into and through the openings in the sides of said sockets and have their extremities headed.

WILLIAM P. BETTENDORF.

Witnesses:
M. FRIEL,
FRANK D. THOMASON.